(12) United States Patent
Hübler et al.

(10) Patent No.: US 8,275,591 B2
(45) Date of Patent: Sep. 25, 2012

(54) CRANE PLANNER

(75) Inventors: Armin Hübler, Bludenz (AT); Ronny Türtscher, Blons (AT); Rene Battlogg, Thüringen (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 908 days.

(21) Appl. No.: 11/811,806

(22) Filed: Jun. 11, 2007

(65) Prior Publication Data

US 2008/0004898 A1 Jan. 3, 2008

(30) Foreign Application Priority Data

Jun. 12, 2006 (DE) .......................... 10 2006 027 202

(51) Int. Cl.
*G06G 7/48* (2006.01)
(52) U.S. Cl. .......................................................... 703/8
(58) Field of Classification Search .............. 703/7, 8; 212/286
See application file for complete search history.

(56) References Cited

U.S. PATENT DOCUMENTS

| 6,587,795 B2 * | 7/2003 | Schmid ........................... 702/42 |
| 2005/0098520 A1 | 5/2005 | Frankenberger et al. |

FOREIGN PATENT DOCUMENTS

EP 0768588 4/1997

OTHER PUBLICATIONS

Varghese, K., Dharwadkar, P., Wolfhope, J. & O'Connor, J. T. (1997), A heavy lift planning system for crane lifts, Micro-Computers in Civil Engineering, 12, 31-42.*
Scott M. Lewandowski. 1998. Frameworks for component-based client/server computing. ACM Comput. Surv. 30, 1 (Mar. 1998), 3-27.*
Reddy, R. & Varghese, K. (2002), Automated path planning for mobile crane lifts, Computer-Aided Civil and Infrastructure Engineering, 17(6), 439-48.*
Temeltas, H. et al: "Hardware in the Loop Simulation of Robot Manipulators through Internet in Mechatronics Education," Proceedings of the 28th Annual conference of the IEEE Industrial Electronics Society, Sevilla, Spain, Nov. 5-8, 2002, pp. 2617-2622.

* cited by examiner

*Primary Examiner* — Kamini S Shah
*Assistant Examiner* — Luke Osborne
(74) *Attorney, Agent, or Firm* — Dilworth & Barrese, LLP.

(57) ABSTRACT

A crane planner for planning an operation of a crane, in particular a crawler crane, with a central planning unit which comprises a central database with data on the usable cranes and a calculation module for calculating the load moments occurring during the operation, wherein the simulation and calculation of the operations is executed by the central planning unit and the input and output of data is effected via clients, the clients communicating with the central planning unit via the Internet.

27 Claims, 7 Drawing Sheets

| LMB values | |
|---|---|
| | current value |
| utilization of the crane [%] | 42.19 |
| max. main boom load | 0.00 t |
| max. luffing boom load | 7.11 t |
| max. ground pressure 0° [bar] | 1.11 |
| max. ground pressure 45° [bar] | 1.13 |
| max. ground pressure 90° [bar] | 1.00 |
| outreach main boom | 0.00 m |
| main boom angle | 77.43 |
| outreach luffing boom | 26.17 m |
| luffing boom angle | 47.42 |

FIG. 7

| Protocol | | | |
|---|---|---|---|
| Cover sheet | | | |
| Date | Project name | Title | .... |
| Load specification | | | |
| Load | Lifting height | Point of load | Load object |
| Simulation | | | |
| Type of crane | Equipment | System data | .... |
| List of steps | | | |
| Number | Coordinates | Slewing angle | Load height |
| Working step 1 Utilization Graphics | Maximum load | Ground pressure | Collision status |
| Working step 2 Utilization Graphics | Maximum load | Ground pressure | Collision status |
| .... | | | |

CRANE PLANNER

BACKGROUND OF THE INVENTION

This invention relates to a crane planner, by means of which the operation of a crane, in particular a crawler crane, can be planned in advance.

In known crane planners, there is usually first selected the crane to be operated with a corresponding equipment, and data on the load and the specific operation are entered. In the crane planner, the operation can now be simulated, and in known crane planners, data on all possible crane configurations and crane positions are created in advance and are then stored in the form of values listed in tables. During the simulation of the operation, these data are interpolated in the intermediate positions, and thus the load moments occurring during operation are determined. When planning the operation, it thereby can already be determined whether the operation is possible with the selected crane and the corresponding equipment and how the crane should be operated, so as not to exceed the maximum load moments or endanger the stability of the crane. Known crane planners usually are software products, which are installed with the respective customer and are running on the computer system of said customer. This results in a very high administrative effort for the service and maintenance of the many crane planners installed with the respective customer, when e.g. new crane components provide new possibilities for fitting the cranes. A particular disadvantage consists in that the respective data on the crane configuration and the possible crane positions must be determined in advance for each configuration and crane position and must then be transferred to the crane planners installed with the respective customer in the form of values listed in tables. In addition, the known crane planners often are complicated to handle and do not sufficiently support the user during planning and during the subsequent actual execution of the planned operation.

SUMMARY OF THE INVENTION

Therefore, it is the object of the present invention to provide a crane planner which can be maintained with little effort, which is easy to handle, and facilitates the execution of the operation.

In accordance with the invention, this object is solved by a crane planner as described herein. The same includes a central planning unit which comprises a central database with data on the usable cranes and a calculation module for calculating the load moments occurring during the operation. Simulation and calculation of the uses are executed by the central planning unit, while input and output of data are effected via clients, the clients communicating with the central planning unit via the Internet. For the input and output of data on the clients, commercially available Internet browsers can be used. As a result, additional software need not be installed on the clients of the customer, as the complex planning unit is located centrally with the provider of the crane planner. The maintenance effort thus is reduced quite considerably, as only the data of the central database must be maintained or merely the calculation module of the central planning unit must be kept up to date. The customers then can access the central planning unit from their clients via the Internet and plan their operations there. This results, on the one hand, in an extremely comfortable handling of the crane planner, where, for instance when using new crane components for fitting the cranes, merely the central planning unit must be maintained and be brought up to date, whereas the software with the customer need not be maintained.

Beside the data on the usable cranes, the database advantageously also comprises data on usable crane components for fitting the cranes. In modern crane systems, this can be quite considerable amounts of data, so that a central storage of these data is of great advantage. By means of the data on the cranes and on the crane components, the corresponding cranes can then be selected for planning an operation and be equipped with the necessary crane components. The database advantageously contains both data on all possible usable cranes and crane components and customer-specific data on the cranes and crane components each present in the fleet of the customer. In this way, the customer can already determine in advance whether a planned operation can be performed with his own material or whether possibly new crane components or cranes are required.

Advantageously, the database comprises three-dimensional geometrical data and physical properties of the usable cranes and the usable crane components. By means of these data, the operation can be planned and a realistic simulation can be created.

Furthermore advantageously, the calculation module for calculating the load moments occurring during the operation employs a physical model of the used cranes and crane set-up conditions and defines maximum load moments. Such physical model of the used cranes has the great advantage that corresponding data for any desired crane position of any desired crane configuration need not be created in advance and then be stored in the form of values listed in tables, but that the values occurring during an operation can be determined and output on a real-time basis. Moreover, an interpolation of the data in intermediate positions of the crane can thus be omitted, which increases the accuracy and reliability of the values. In particular because with the multitude of usable crane components quite considerable numbers of possible crane set-up conditions can easily be obtained, the calculation by a physical model considerably saves time and costs. The physical model thus provides for a real-time calculation of the load moment limitation (LMB), i.e. an output of the structural and tilting loads, the ground pressure as well as further relevant data on the respective crane configurations in the corresponding crane positions during the planned operation.

Advantageously, the calculation module of the central planning unit employs the same physical model as the load moment limitation of the crane used. When both the load moment limitation firmly installed in the crane used and the calculation module employ the same physical model, it is ensured that the data calculated while planning the operation correspond with the load moment limitation data occurring during the actual operation, so that the customer here is safe from an unpleasant surprise.

Upon entering a case of load, the planning unit advantageously automatically determines the types of crane and crane set-up conditions to be used. Advantageously, both a simple search and an expert search, where a plurality of parameters can be defined, are possible here. The customer must merely enter data on the respective case of load, such as the weight of the load, the lift height and the necessary lift capacity, and the planning unit automatically calculates which types of crane and crane set-up conditions are possible for this case of load. Thus, the customer immediately knows with which crane set-up condition the planned operation is possible.

Advantageously, the alignment of the crane for picking up the load object is effected automatically upon defining crane position and load position. Handling thus is simplified considerably, as in this way the crane position (e.g. rotary position of the uppercarriage and angular position of the main boom or luffing boom of the crane) is determined automatically and need not first be entered by the customer. Planning times are thereby reduced quite considerably.

Advantageously, a scenario simulating the operation is created for planning the operation. Advantageously, the crane and further objects can be positioned in the scenario. Furthermore advantageously, objects can be defined in the scenario and be linked with data and attributes. For this purpose, name and color of the object can be defined, whether it is a load object and which mass it possibly has, whether the load is provided on the hook and what coordinates or dimensions the object has. Such scenario usually comprises the used crane, the load object, the surroundings and possible disturbing objects. Simple disturbing objects advantageously can be composed of standard objects such as cuboids, spheres, cones, pyramids, cylinders and prisms. Thus, a realistic simulation of the operation can be performed and all working steps of the operation can be gone through in the scenario.

Furthermore advantageously, the planning unit uses a three-dimensional model for simulating the operation. For this purpose, three-dimensional geometrical data of the used crane and of the used crane components can be used and the movement thereof in a three-dimensional scenario can be determined.

Advantageously, the database not only comprises the three-dimensional data of the cranes, but also three-dimensional data of possible disturbing objects, where on the one hand standard objects can be provided and on the other hand such standard objects can be grouped to form larger objects and be stored in a user-dependent library and be reused. Parallel thereto, a general library, which is accessible to all users, also can comprise more complex objects.

Advantageously, three-dimensional data of objects furthermore can be retrieved from external sources. When such three-dimensional data of objects can be imported from external data sources, the customer can include e.g. his own CAD data of the load objects or of disturbing objects in the simulation of the case of load. These data then can possibly be stored in a user-dependent library, and it is also possible to use 3D models from generally accessible sources from the Internet.

Advantageously, objects of the scenario can be shifted individually in the scenario via an input interface of the client, in particular a mouse, or be controlled by parameter input. The objects thus can be shifted by "drag and drop" in a user-friendly and intuitive way or be positioned exactly by parameter input.

Advantageously, a collision check between crane and possible disturbing objects and between crane and load is performed when simulating the operation. It can thus be determined whether the crane including the load cable collides with disturbing objects during the planned use, so that planning can be adapted correspondingly already before the use.

Advantageously, the load circuit for the front and rear disturbing edges, i.e. for boom and counterweight or derrick or ballast carriage, can be determined and displayed. For representation, there is advantageously used a hatched area in the scenario. This is of great interest to the user, as the load circuits important for planning the operation thus can be seen at one sight.

Advantageously, a raster is displayed along the middle axis of the boom. This facilitates planning, as by means of the raster the distances of e.g. the boom from the disturbing object can easily be seen.

Advantageously, the center of gravity of the crane is determined and displayed. By displaying and outputting the center of gravity, this value important for stability can quickly be recognized.

Advantageously, several different views of one working step can be represented at the same time. Such representation then comprises e.g. a 2D elevation, a side view and a plan view as well as the 3D representation, wherein each of these representations can be enlarged.

Advantageously, individual working steps or scenarios can be stored. All operation-relevant data advantageously can be stored in projects, and for each project any number of construction sites and for each construction site any number of working steps can be stored. All crane positions planned for one crane operation can be stored with all relevant data as working steps. Likewise, graphics prepared for this purpose and relevant load moment limitation data can be stored.

Advantageously, a protocol of all working steps of a planned operation is prepared automatically. Such protocol then includes all data necessary for performing the operation, so that upon planning a safe and reliable execution of the operation is possible.

Furthermore, a film sequence of several working steps of the planned operation can be prepared advantageously. During playback of the film sequence, all working steps are shown, which permits a simple visualization of the entire operation.

With the customer, 3D viewers must merely be installed as client, on which the 3D representations of the respective scenario can be represented. The customer himself possibly can design the desired crane configuration by selecting the cranes and crane components and placing the same in a three-dimensional model. He can also create and store the scenario himself by selecting or creating disturbing objects and the surrounding structures. There is merely effected the input and output of data via the 3D viewer on the client of the customer, whereas the entire planning and calculation is executed on the central planning unit. The 3D viewers of the customer communicate with the central planning unit via the Internet, so that on the one hand an efficient handling and a permanent access to all relevant data is possible, while on the other hand the maintenance costs for the crane planner are minimized. Safety also is increased thereby, as all safety-relevant data are administered centrally and all safety-relevant calculations are effected in the central planning unit.

This results in an easy-to-handle and extremely realistic planning of the operation, the automatic creation of the protocol considerably facilitating the execution of the actual operation.

The invention furthermore comprises a method for planning an operation of a crane, in particular a crawler crane, by means of a crane planner with a central planning unit which comprises a central database with data on the usable cranes and a calculation model for calculating the load moments occurring during the operation, comprising the following steps:

input of the data of a case of load on a client,
    transmission of the data of the case of load to the central planning unit via the Internet,
    simulation and calculation of the operation by the central planning unit,
    transmission of the data created by the planning unit to the client via the Internet,
    output of the data created by the planning unit on the client.

This method has the advantages already mentioned in the description of the crane planner, such as user-friendliness and easy maintenance. Thus, it is merely necessary to keep the central planning unit and the central database up to date, without software having to be maintained with the customer. In particular, the administrative effort is also reduced thereby.

Advantageously, the output of the data created by the planning unit on the client comprises a three-dimensional representation of a scenario.

Furthermore advantageously, the simulation and calculation of the operation by the central planning unit comprises an automatic alignment of the crane with a load object.

Furthermore advantageously, working steps can be stored and a protocol of all working steps can be created automatically.

Furthermore advantageously, the simulation and calculation of the operation is effected by the central planning unit by means of a physical model of the crane.

Said aspects of the method have the same advantages as the corresponding features described already in the description of the crane planner. Furthermore, all other features of the crane planner described there and the use thereof are advantageous when planning an operation by the method of the invention.

BRIEF DESCRIPTION OF THE DRAWINGS

The invention will now be described in detail with reference to an embodiment, in which:

FIG. 7: shows a schematic representation of the protocol.

DESCRIPTION OF THE PREFERRED EMBODIMENTS

Figure 1:
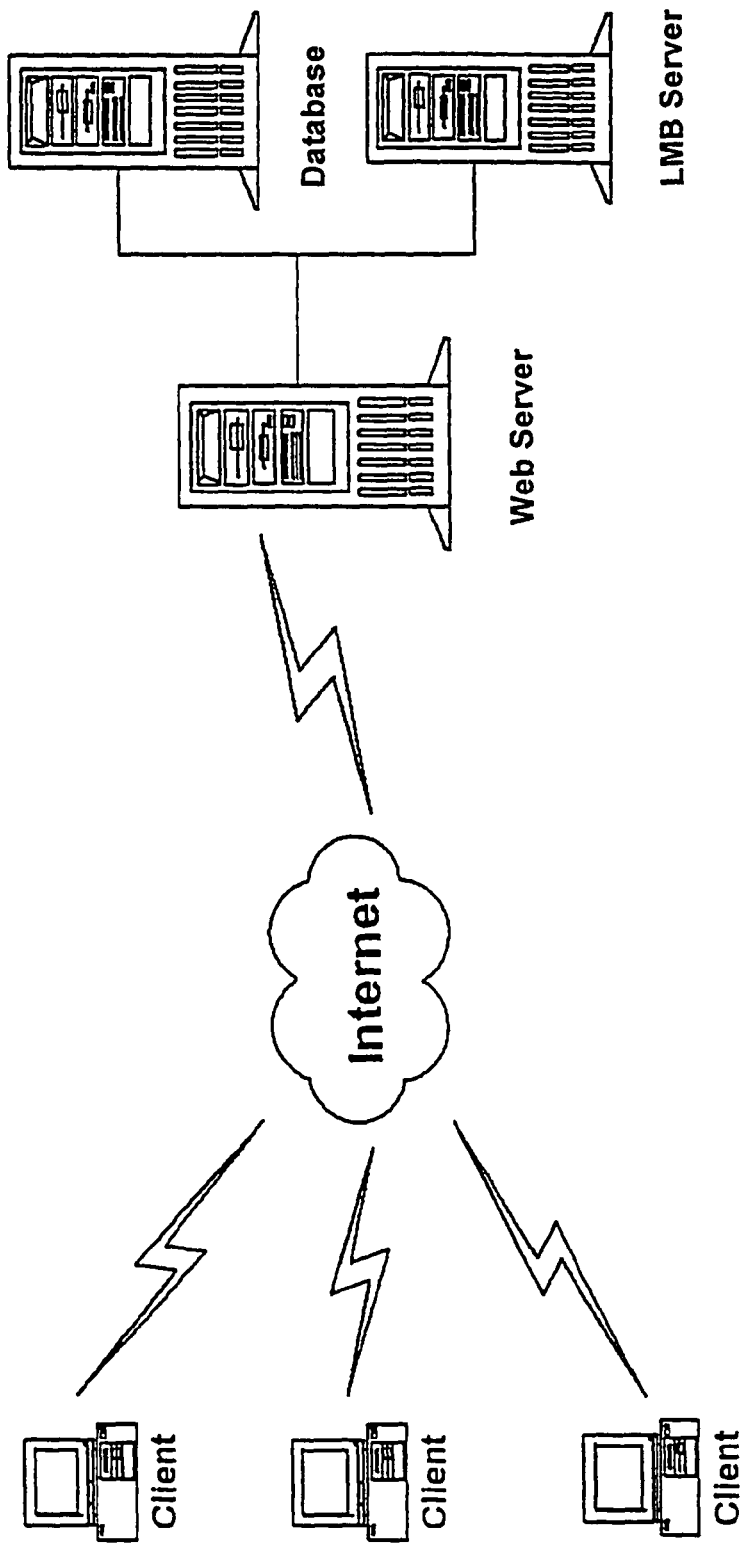
FIG. 1: shows the general structure of the crane planner.

FIG. 1 shows the structure of the crane planner. On the right in FIG. 1, the central planning unit is shown, which consists of a Web server, a database and an LMB server. In the database, all relevant data on the usable cranes and usable crane components are stored as well as the objects and scenarios created by the customer. The LMB server comprises the calculation module for calculating the load moments occurring during the operation, wherein a physical model is used, which corresponds to the load moment limitation of the used cranes. The Web server communicates with the database and the LMB server and is connected to the Internet, so that it communicates with the clients of the customer via the Internet. On the clients of the customer, 3D viewers are merely installed, by means of which data created by the planning unit can be displayed. Further software installations on the clients are not necessary, as the entire planning is executed centrally by the planning unit.

At the beginning of crane planning, a load specification is defined by entering relevant data on the load object, such as load, lift height, outreach, etc. Furthermore, a 3D world (scenario) with any kind of disturbing objects can be created, which permits a realistic simulation of the crane operation. The individual objects in this scenario can be provided with attributes.

In particular the following items of information are linked to form an object:

name
color
load object (yes/no)
    if load object: mass of the object
load on the hook (yes/no)
slewing angle of the object
coordinates
dimension
surface structure Beside the load objects, disturbing objects can also be created, which represent the surroundings of the operation. Simple disturbing objects can be composed of standard objects such as cuboids, spheres, cones, pyramids, cylinders and prisms. Furthermore, a constellation of such standard objects can be grouped and stored in a user-dependent library and thus be reused. Parallel thereto, there also exists a general library, which is accessible to all users.

Furthermore, data can also be imported from external data sources. In particular, 3D data of CAD models of the customer as well as 3D models from the Internet (e.g. for trucks) can be used here. These 3D data can also be integrated in the scenario as load objects or disturbing objects. In this way, an extremely realistic simulation of the place of operation is obtained in the scenario.

By means of the previously defined case of load, the program can automatically determine the types of crane and crane configurations to be used for the crane operation. It is possible here to search for the proper crane configuration either by simple search with only one or few parameters or by expert search, in which several parameters of the case of load can be defined. There is also possible a manual configuration of the crane and the crane equipment, where the user can configure three-dimensionally represented crane components and cranes in the 3D viewer to obtain the desired crane set-up condition.

The selected crane now is represented in the scenario in three-dimensional form. In the 3D scenario, various disturbing objects can also be planned and positioned. Both the crane and disturbing and load objects can simply be shifted in the scenario with the mouse, which permits a particularly simple and intuitive handling. The individual objects can, however, also be controlled by parameter input. The planning unit then automatically calculates the crane position necessary for picking up the load object, where e.g. the slewing position of the uppercarriage and the angular position of the main boom and of the luffing boom can be determined.

For each working step in parallel, the calculation module with the LMB now determines the corresponding crane data such as tilting load, structural load, ground pressure, utilization, etc. and outputs the same. In particular, structural and tilting loads are determined and compared with maximum values, which due to the use of the same load moment limitation as in the used crane exactly correspond to the values occurring during the actual operation.

There is also performed a collision check of the crane along with cable and load with the disturbing objects in the scenario, so that it is ensured that the planned working steps can actually be performed.

The load circuit for the front and rear disturbing edges, i.e. boom and counterweight or derrick and ballast carriage, is also determined and represented in the scenario as raster surface. The center of gravity of the crane can also be determined and be displayed or output.

To facilitate planning, a raster can directly be displayed along the middle axis of the boom. By means of the raster, distances e.g. of the boom from the disturbing object can be indicated.

Parallel to planning the crane operation, all working steps can be stored and then serve the automatic generation of a protocol on the crane operation. The data determined by the LMB are transmitted via the Internet to the 3D viewers, where the corresponding scenario with the crane position is represented in three-dimensional form. Here, a plurality of different views of the working step are represented at the same time, such as a 2D elevation, side view and plan view as well as a 3D representation. Each of these views can also be enlarged. Furthermore, all relevant data of the working step are represented. A protocol of all working steps with all relevant LMB data and graphics can be created, which then can be processed step by step when performing the operation. Furthermore, a film sequence of all working steps can be generated, which thus provides a realistic impression of the course of the operation.

Figure 2:
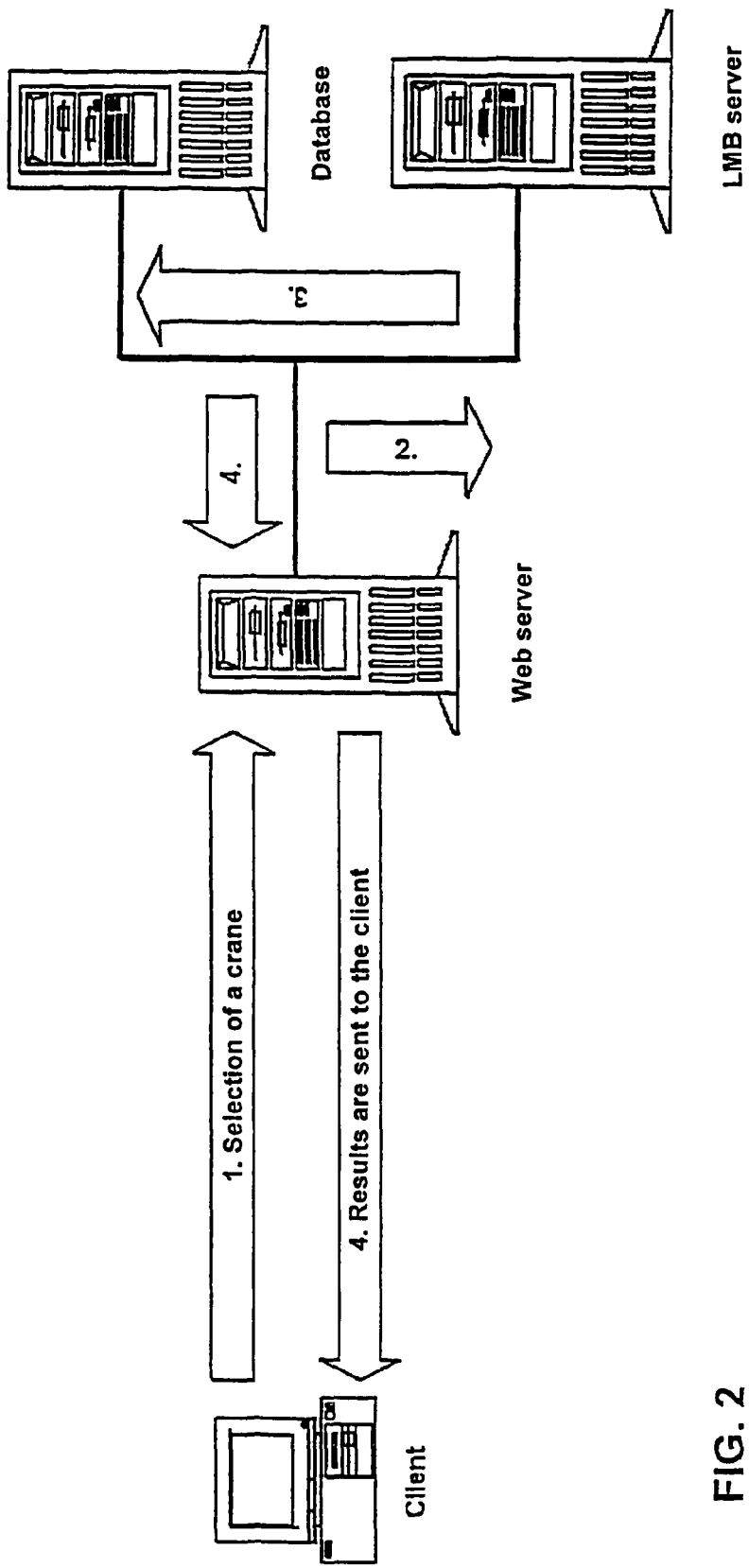
FIG. 2: shows a crane selection.

By way of example, FIG. 2 shows a crane selection, which in this case is a manual selection and compilation. In a first step, the user of the crane planner for this purpose selects the corresponding crane with the respective equipment from a list provided by the crane planner. These data then are sent from the client to the Web server of the central planning unit, where they are received by the Web server and forwarded to the LMB server. From the data for the crane selection, the LMB server then creates the corresponding physical crane model and stores crane selection and crane position in the database. For each working step, all relevant data are calculated, stored and sent back via the Web server to the client by the LMB server. The results of the calculation, such as the LMB values, the position of the booms and the cables, are received by the client and output in the form of 3D graphics and lists.

Figure 3:
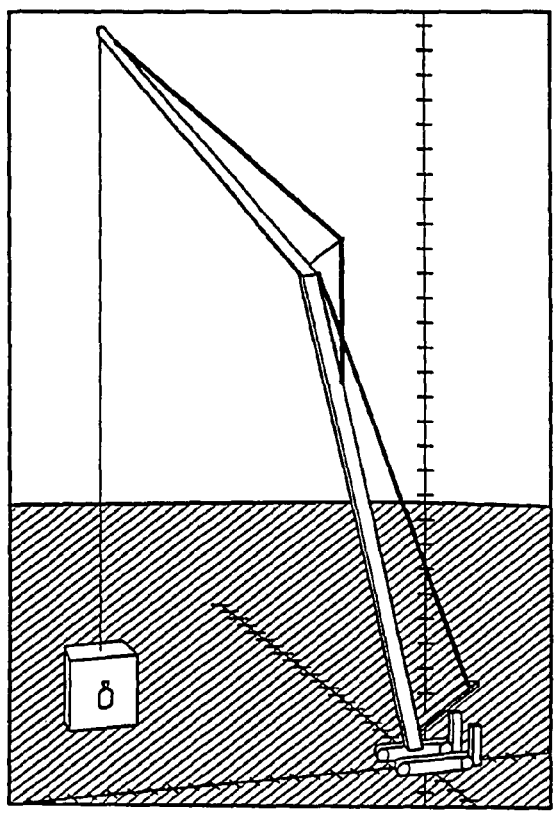
FIG. 3: shows the output of the values calculated for one working step.

FIG. 3 shows a typical output on the client. On the left, a 3D image illustrates the scenario with the crawler crane and the load, whereas on the right relevant data such as utilization of the crane, outreach, ground pressure and boom angle are indicated. In this way, the position of the crane and of the load on the one hand is graphically illustrated in an easily comprehensible form, and on the other hand all relevant data are indicated in detail.

Figure 4:
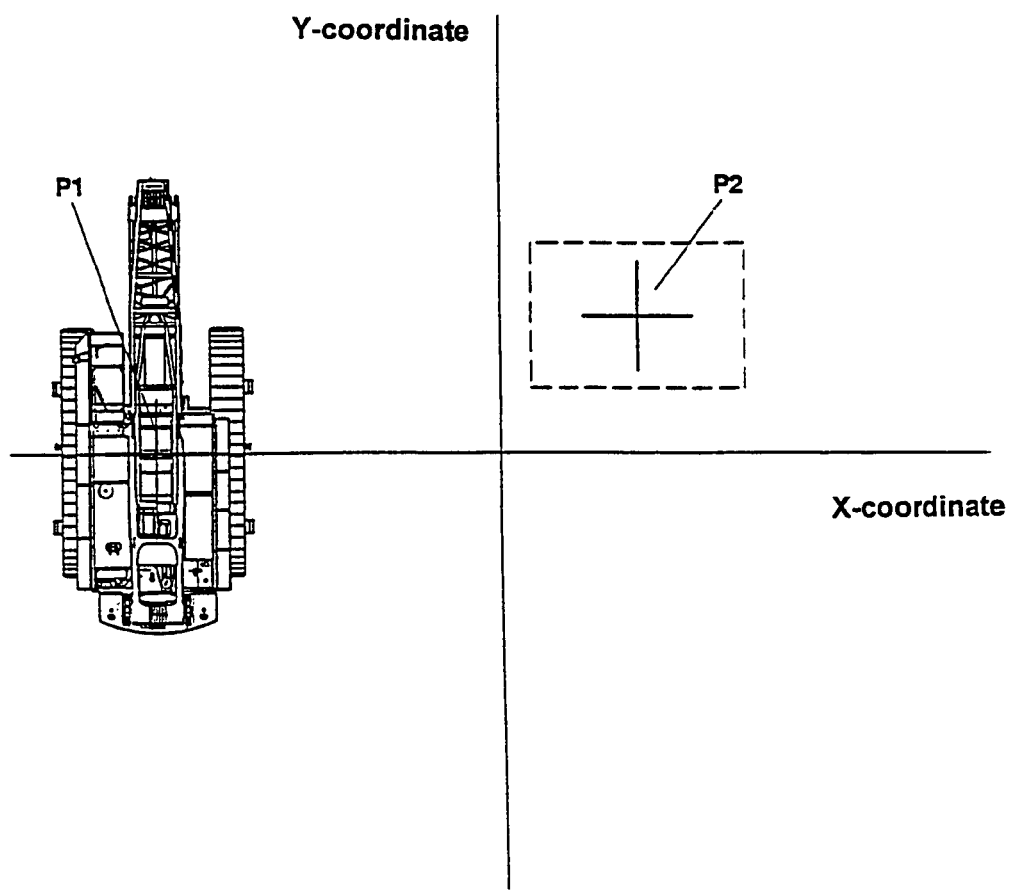
FIG. 4: shows a first step of an alignment of the crane.
Figure 5:
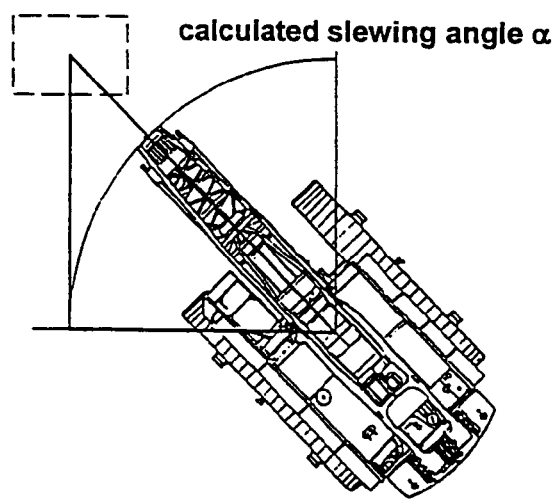
FIG. 5: shows a second step of the alignment of a crane.

FIG. 4 and FIG. 5 illustrate the automatic alignment of the crane with the load. After the coordinates P1 of the crane and the coordinates P2 of the load object have been entered, as shown in FIG. 4, this function calculates the slewing angle a of the rotation of the uppercarriage as well as the boom position for the required outreach between P1 and P2. Since the positions of crane and load object are already given, the stewing angle can be calculated exactly without the user having to take action here himself.

Figure 6:
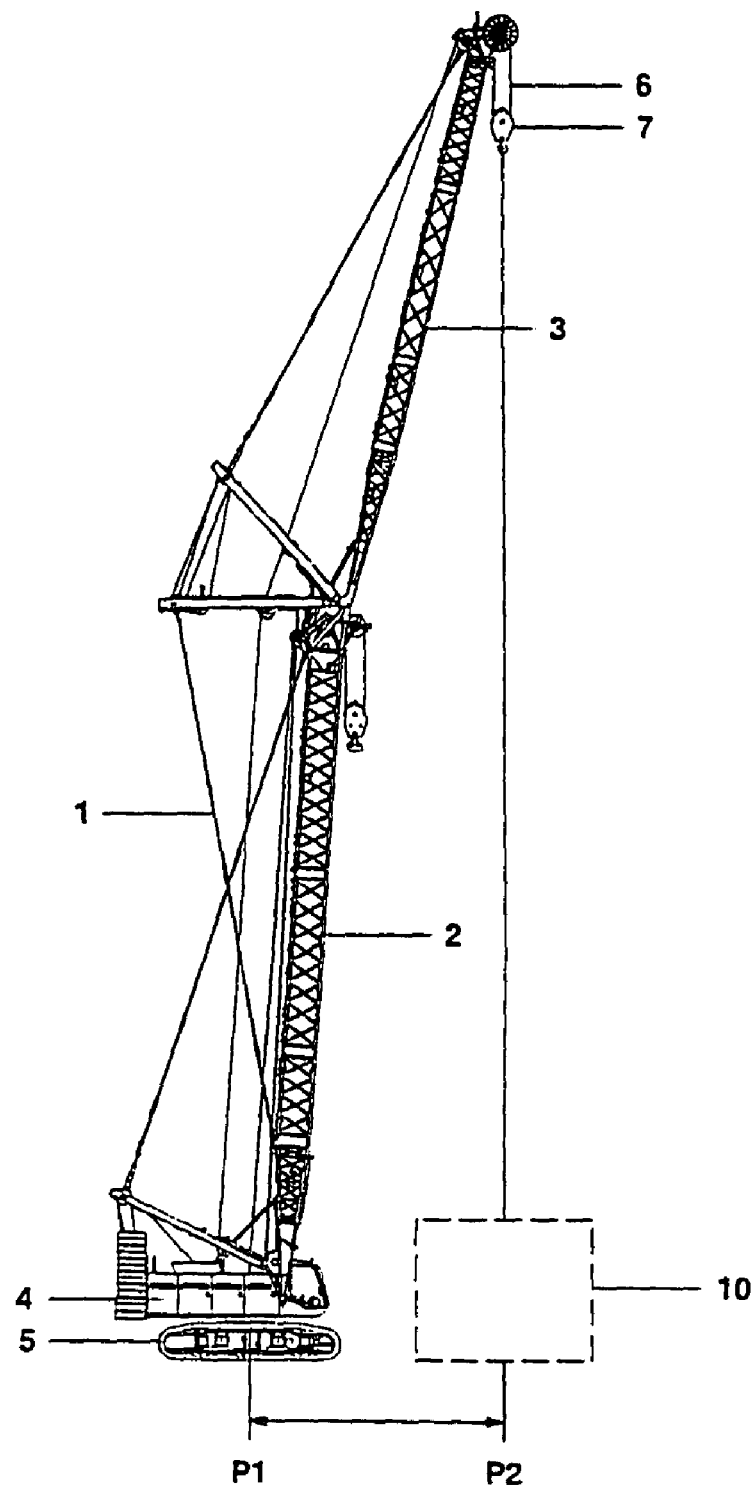
FIG. 6: shows the calculation of an outreach.

With reference to FIG. 6, the calculation of the outreach of a crane 1 can now be described. The crane 1 consists of an undercarriage 5 with crawler drive as well as a rotatable uppercarriage 4, on which a main boom 2 with a luffing boom 3 is pivotally mounted. The load object 10 is to be lifted via a cable 6 and a pulley 7. As described already with respect to FIGS. 4 and 5, the slewing position of the uppercarriage 4 of the crane 1 located at the point P1 with respect to the load object 10 located at the point P2 can be determined automatically.

For calculating the outreach, automatic and manual calculation modes exist, where the two variables to be determined are the tilting angle of the main boom and the tilting angle of the luffing boom.

In the automatic calculation mode, the angles of main boom and luffing boom are varied automatically, in order to achieve the desired outreach. The luffing boom angle always is offset by 10° with respect to the main boom angle, in order to ensure a maximum load capacity of the crane.

In the manual calculation mode, the range of angles of the main boom can be restricted, in order to avoid e.g. collisions with disturbing objects. When the maximum main boom angle is reached, it therefore is attempted to achieve the outreach via the angle of the luffing boom.

All data and working steps can be stored, a protocol of the crane operation being created automatically. FIG. 7 schematically shows the structure of such protocol.

The cover sheet of the protocol contains general information on the project, such as the date, project name, document title, document number, version and creator.

Then, detailed information on the load specification is output. Such information on the one hand includes information on the load, lift height (distances from the pulley to the load) as well as information on the point of load and the load object, and with respect to the load object, the dimensions and the stewing angle can be indicated in particular.

In the simulation section, all relevant crane data required by the crane operator for the planned lifting operation are printed out. In particular, these crane data include the type of crane, the operating mode, information on the equipment and the point of load. In particular, there are also provided data on the main boom, on the luffing boom and on the ballast.

Next, the protocol includes a step list of all working steps, which contains the most important data on the working steps in the form of a table. As an operation often consists of several steps with different loads, the step list includes all planned working steps with the respective crane position, the slewing angles as well as load and hook height in the form of a table. The individual working steps are numbered for easy recognition.

Then, the protocol includes detailed information on the individual working steps. Here, utilization, maximum load, ground pressure and collision status are additionally indicated as current values and as maximum values. The same are output for each working step both in the form of a table and also represented graphically. The protocol contains this detailed information for each individual working step.

Figure 8:
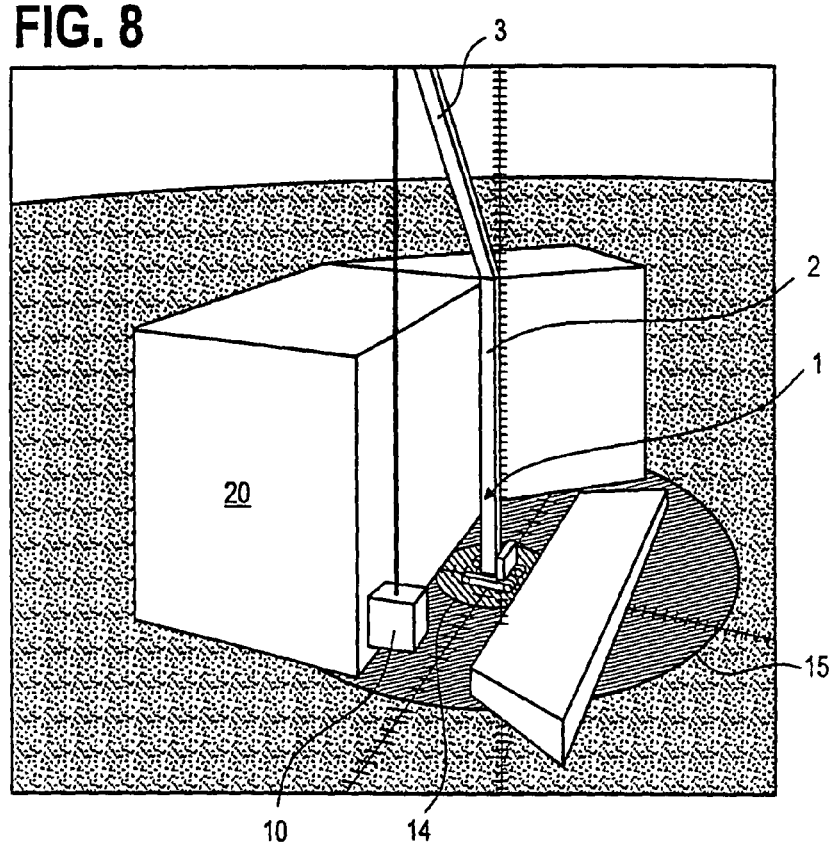
FIG. 8: shows the graphical representation of a working step.
Figure 9:
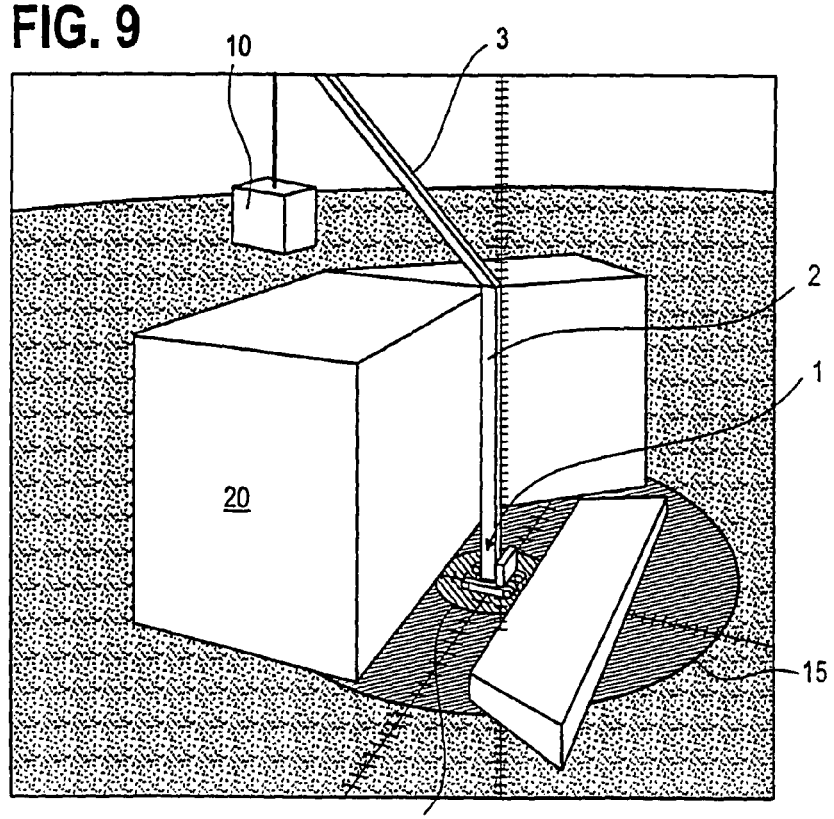
FIG. 9: shows a further graphical representation of a working step.

FIG. 8 and FIG. 9 show graphical representations of two working steps. Both graphical representations show the crane 1 with main boom 2 and luffing boom 3 in different working positions in a three-dimensional scenario. Beside the crane 1, the load 10 and disturbing objects 20 are indicated, so that the planned working step can be recognized at one sight. There are also illustrated the load circuits for the front and rear disturbing edges, which are represented in the 3D scenario as hatched areas with the edges 14 and 15.

The invention claimed is:

1. A crane planner for planning the operation of a crane, in particular a crawler crane, comprising
   a central planning unit comprising a central database with data on usable cranes and a calculation module for calculating load moments occurring during operation,
   the central planning unit executing simulation and calculation of the operations,
   means for inputting and outputting data to and from the central planning unit from individual clients via the Internet,
   the individual clients each separately communicating with the central planning unit via the Internet via available internet browsers and inputting client-specific data to the central planning unit for calculation,
   such that additional software for performing moment calculations need not be installed by each client and only software in the central planning unit must be maintained and updated, it being unnecessary to maintain software of the individual clients, wherein said load moments are calculated for a plurality of aspects during the operation of the crane and displayed on the individual clients, wherein the center of gravity of the crane is determined and displayed, and wherein a plurality of different views of one working step are represented at the same time.

2. The crane planner as claimed in claim 1, wherein the central database contains data on usable crane components to be fitted on the cranes.

3. The crane planner as claimed in claim 2, wherein the database contains three-dimensional geometrical data and physical properties of the usable cranes and usable crane components.

4. The crane planner as claimed in claim 1, wherein the calculation module for calculating the load moments occurring during the operation employs a physical model of the crane and crane set-up conditions and defines maximum load moments.

5. The crane planner as claimed in claim 4, wherein the calculation module uses the same physical model as the maximum load moments of the crane.

6. The crane planner as claimed in claim 1, wherein the central planning unit automatically determines the types of crane and crane set-up conditions to be used upon input of a case of load.

7. The crane planner as claimed in claim 1, wherein upon definition of crane position and load position the alignment of the crane for picking up a load is effected automatically.

8. The crane planner as claimed in claim 1, wherein a scenario simulating the operation is created for planning the operation.

9. The crane planner as claimed in claim 8, wherein the crane and further objects are positioned in the scenario.

10. The crane planner as claimed in claim 8, wherein objects in the scenario can be linked with data and attributes.

11. The crane planner as claimed in claim 8, wherein objects in the scenario can be shifted individually in the scenario via an input interface of the client, in particular a mouse, or are controlled by parameter input.

12. The crane planner as claimed in claim 1, wherein the central planning unit employs a three-dimensional model for simulating the operation.

13. The crane planner as claimed in claim 12, wherein a collision check between crane and possible disturbing objects and between crane and load is performed when planning the operation.

14. The crane planner as claimed in claim 1, wherein the central database contains three-dimensional data of possible disturbing objects.

15. The crane planner as claimed in claim 1, wherein three-dimensional data of objects can be retrieved from external sources.

16. The crane planner as claimed in claim 1, wherein a load circuit for front and rear disturbing edges is determined and displayed.

17. The crane planner as claimed in claim 1, wherein a raster is displayed along the middle axis of the boom.

18. The crane planner as claimed in claim 1, wherein individual working steps or scenarios can be stored.

19. The crane planner as claimed in claim 1, wherein a protocol of all working steps of the planned operation is created automatically.

20. The crane planner as claimed in claim 1, wherein a film sequence of a plurality of working steps of the planned operation is created.

21. A method for planning an operation of a crane, in particular a crawler crane, with a crane planner with a central planning unit which comprises a central database with data on usable cranes and a calculation module for calculating load moments occurring during the operation, comprising the following steps:

inputting load data on a client, transmitting the load data to the central planning unit via the Internet, the central planning unit containing a database on all possible usable cranes, simulating and calculating the operation by the central planning unit, transmitting the data created by the central planning unit to the client via the Internet, and outputting the data created by the central planning unit by the client without installing additional software for performing moment calculations by the client and only maintaining and updating software in the central planning unit, it being unnecessary to maintain software of individual clients, wherein said load moments are calculated for a plurality of aspects during the operation of the crane and displayed on the individual clients, wherein the center of gravity of the crane is determined and displayed, and wherein a plurality of different views of one working step are represented at the same time.

22. The method as claimed in claim 21, wherein the output of the data created by the central planning unit on the client comprises a three-dimensional representation of a scenario.

23. The method as claimed in claim 21, wherein the simulation and calculation of the operation by the central planning unit comprises an automatic alignment of the crane with a load object.

24. The method as claimed in claim 21, wherein working steps can be stored.

25. The method as claimed in claim 21, wherein a protocol of all working steps is created automatically.

26. The method as claimed in claim 21, wherein the simulation and calculation of the operation by the central planning unit is effected by means of a physical model of the crane.

27. A crane planner for planning the operation of a crane, in particular a crawler crane, with a central planning unit comprising a central database with data on usable cranes and a calculation module for calculating load moments occurring during operation, wherein simulation and calculation of the operations is executed by the central planning unit and the input and output of data is effected via clients, the clients communicating with the central planning unit via the Internet, a scenario simulating the operation is created for planning the operation, the crane and further objects are positioned in the scenario, and objects in the scenario can be linked with data and attributes, wherein said load moments are calculated for a plurality of aspects during the operation of the crane and displayed on the individual clients, wherein the center of gravity of the crane is determined and displayed, and wherein a plurality of different views of one working step are represented at the same time.

* * * * *